United States Patent [19]
Yoneda et al.

[11] Patent Number: 4,763,340
[45] Date of Patent: Aug. 9, 1988

[54] CAPACITIVE COUPLING TYPE DATA TRANSMISSION CIRCUIT FOR PORTABLE ELECTRONIC APPARATUS

[75] Inventors: Shigeo Yoneda, Yamatokoriyama; Masato Hiramoto, Kyoto; Akira Kanayama, Yamatokoriyama, all of Japan

[73] Assignee: Sharp Kabushiki Kaisha, Osaka, Japan

[21] Appl. No.: 683,645

[22] Filed: Dec. 19, 1984

[30] Foreign Application Priority Data

Dec. 22, 1983 [JP] Japan ................. 58-249779

[51] Int. Cl.⁴ .................... H04J 23/00; H01J 9/38
[52] U.S. Cl. ....................... 375/121; 455/41; 340/870.37
[58] Field of Search ............ 375/22, 45, 62, 65, 375/68, 4, 88, 6, 121; 455/40, 41, 42; 370/51, 52, 9; 331/177 V, 179; 179/82; 178/43, 1; 324/60 R; 340/870.37

[56] References Cited

U.S. PATENT DOCUMENTS

| | | | |
|---|---|---|---|
| 1,318,165 | 10/1919 | McCullough | 179/82 |
| 1,899,527 | 2/1933 | Purington | 375/62 |
| 3,265,972 | 8/1966 | Curry | 455/40 |
| 4,255,812 | 3/1981 | Huellwegen | 375/4 |
| 4,462,107 | 7/1984 | Vance | 375/88 |

*Primary Examiner*—Robert L. Griffin
*Assistant Examiner*—Andrew J. Telesz, Jr.
*Attorney, Agent, or Firm*—Birch, Stewart, Kolasch & Birch

[57] ABSTRACT

A capacitive type coupling data transmission system for portable electronic apparatus is comprised of an input circuit, a capacitance changing circuit, a transmitting circuit capacitively coupled to, a receiving circuit, and a detecting circuit for detecting any change in the capacitance changing circuit. A data signal to be transmitted is inputted into the input circuit. Based on the value of an inputted binary digital data signal, the capacitance of the capacitance changing circuit is changed. The capacitance change is capacitively transmitted from the transmitting circuit to the receiving circuit and detected thereat. The detecting circuit may be an oscillator circuit, a an RC differentiating circuit, or an RC integrating circuit.

10 Claims, 1 Drawing Sheet

CAPACITIVE COUPLING TYPE DATA TRANSMISSION CIRCUIT FOR PORTABLE ELECTRONIC APPARATUS

BACKGROUND OF THE INVENTION

The present invention relates to a non-contact type data transmission system between electronic apparatus and, more particularly, to a capacity coupling type data transmission circuit for portable electronic apparatus.

A conventional non-contact type data transmission system for electronic apparatus is typically of an optical or magnetic coupling type. The optical coupling type system comprises a light emitting diode in a transmitting unit and a phototransistor in a receiving unit for receiving light from the diode. The magnetic coupling type system is comprised of a magnetic sensor and a pick-up coil.

Since the signal processing system of each apparatus is electrically isolated from that of the other, the operating voltage level of the electronic apparatus can be converted. However, they are driven with currents which results in large power being consumed and thus a complex circuit is needed. Therefore, they are not suitable for a portable electronic apparatus driven with a small voltage, for example, provided from a battery.

SUMMARY OF THE INVENTION

Accordingly, it is an object of the present invention to provide an improved non-contact type data transmission system suitable for electronic apparatus.

It is another object of the present invention to provide a novel capacitance type coupling data transmission system suitable for a portable electronic apparatus driven with a small voltage, for example, provided from a battery.

It is a further object of the present invention to provide a novel capacitance type coupling data transmission circuit suitable for a portable electronic apparatus of the type in which a capacitance value in a transmitting unit is changed according to a signal to be transmitted and the capacitance change can be detected in a receiving unit to provide a received signal.

Briefly described, in accordance with the present invention, a capacitance type coupling data transmission system for electronic apparatus comprises input means for inputting a data signal to be transmitted, capacitance changing means for changing its capacity according to the value of the data signal, means for capacitively transmitting the capacitance change, of the capacity changing, receiving means for receiving the capacitance change and capacitance detecting means for detecting the change of the capacitance changing means to provide a signal to be detected. Preferably, the capacitance detecting means comprises an oscillation circuit, an RC differentiating circuit, or an RC integrating circuit.

BRIEF DESCRIPTION OF THE DRAWINGS

The present invention will become more fully understood from the detailed description given hereinbelow and the accompanying drawings which are presented by way of illustration only, and thus are not meant to limit of the present invention, and wherein.

DESCRIPTION OF THE PREFERRED EMBODIMENTS

Figure 1:
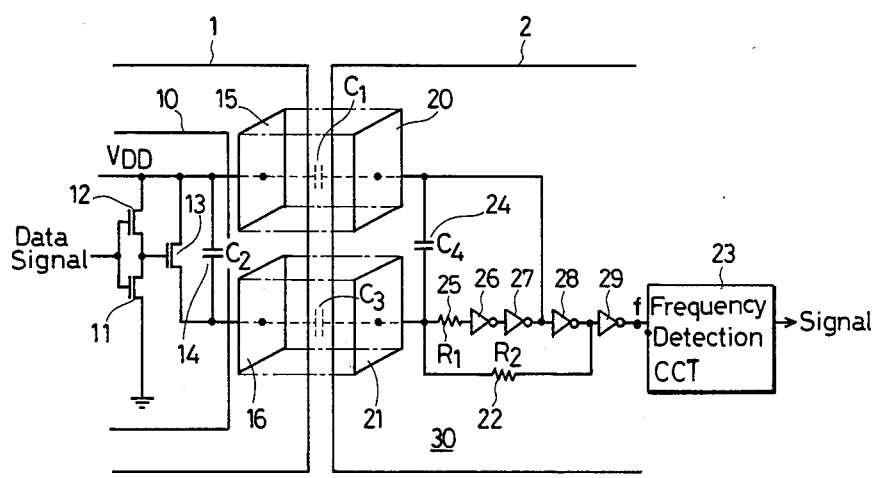
FIGS. 1 and 2 are block diagrams of two embodiments of a capacity coupling type data transmission system for portable electronic apparatus according to the present invention.

With reference now to FIG. 1, there is provided a data-transmitting unit 1 in a first electronic apparatus and a data-receiving unit 2 in a second electronic apparatus. The data-transmitting unit 1 comprises an inverter circuit consisting of a pair of metal oxide semiconductor (MOS) transistors 11 and 12. A data signal to be transmitted is inputted into the input terminal of the inverter circuit. An MOS transistor 13 is provided which is switched on and off by the reversed data signal from the inverter circuit. A capacitor 14 (C2) is coupled in parallel with the MOS transistor 13. These circuit elements are additionally included in a large scale integrated circuit (LSI) 10. Across the capacitor 14, is a pair of electrically conductive plates 15 and 16, both made of an electrically conductive metal or any other conductive material.

The data-receiving unit 2 comprises a pair of electrically conductive plates 20 and 21 which are opposed to and capacitively coupled with the pair of conductive plates 15 and 16 to provide coupling capacitances of C1 and C3. In parallel with the pair of plates 20 and 21, a is connected a capacitor 24 (C4). A resistance 25 (R1) and four inverters 26, 27, 28, and 29 are connected to the capacitor 24 to form a series circuit. In parallel with the circuit elements including the resistance R1 and the four inverters 26-28 is, a resistance 22 (R2) which is provided to form an oscillator circuit 30. A frequency detection circuit 23 is provided for detecting the frequency of the oscillator circuit and outputting a signal to be received by an external circuit, not shown.

The operation of FIG. 1 is as follows: When the data signal to be transmitted is of a low level of "0", it is inputted into the MOS transistor 13 via the MOS inverter circuit 11 and 12 whereupon the MOS transistor 13 is switched off. Accordingly, at the data-receiving unit 2, the composite capacitance Ca of the oscillation circuit 30 is approximately as follows:

$$Ca = C4 + \frac{C1C2C3}{C1C2 + C2C3 + C3C1}$$

Theoretically, for a free running multivibrator having an RC time constant, the oscillation frequency f is as follows:

$$f = \frac{1}{2.2\,RC}$$

That occurs because the period of the oscillation frequency f is an addition of the signal rise time "tau 1" and its fall time "tau 2" as follows:

$$T = \text{tau 1} + \text{tau 2} = RC\left[\ln\left(\frac{Vth}{Vdd + Vth}\right) + \ln\left(\frac{Vdd - Vth}{2Vdd - Vth}\right)\right]$$

where
Vdd is the source voltage and

Vth: is the mid-voltage point of the source voltage

If Vth is assummed to be Vdd/2, T approximately equals 2.2 RC. Therefore, the oscillation frequency f is as stated above.

Accordingly, for a "0" level an oscillation output frequency fa of the oscillator circuit 30 is produced which is approximately equal to 1/2.2R2Ca because, in this case, R=R2 and C=Ca. When the data signal of a is a high level of "1", the MOS transistor 13 is switched on. The composite capacity Cb of the oscillator circuit now becomes, as an approximation:

$$Cb = C4 + \frac{C1C3}{C1 + C3}$$

Another oscillator output frequency fb of the oscillator circuit 30 is now produced and is approximately equal to 1/2.2R2Cb because, in this case, C=Cb and R=R2.

The data-receiving unit 2 includes a frequency detection circuit 23 which operates to detect a change in the oscillation frequency to sense the binary level value of the transmitted data signal, thereby converting it into the received signal. The capacitance between the pair of electrically conductive plates 15 and 16 at the data-transmitting unit 1 is changed according to the data signal input and the data-receiving unit 2 detects this capacitance change. The embodiment of FIG. 1 operates by using the fact that when the MOS transistor 13 is switched on for providing the capacity change, the capacitance of the capacitor 14 (C2) is approximately zero.

When desirable, the MOS transistor 13 may be replaced by any bipolar type transistor. Further, the oscillator circuit 30 of the data-receiving unit 2 may be replaced by an RC differentiating circuit or an RC integrating circuit.

Figure 2:
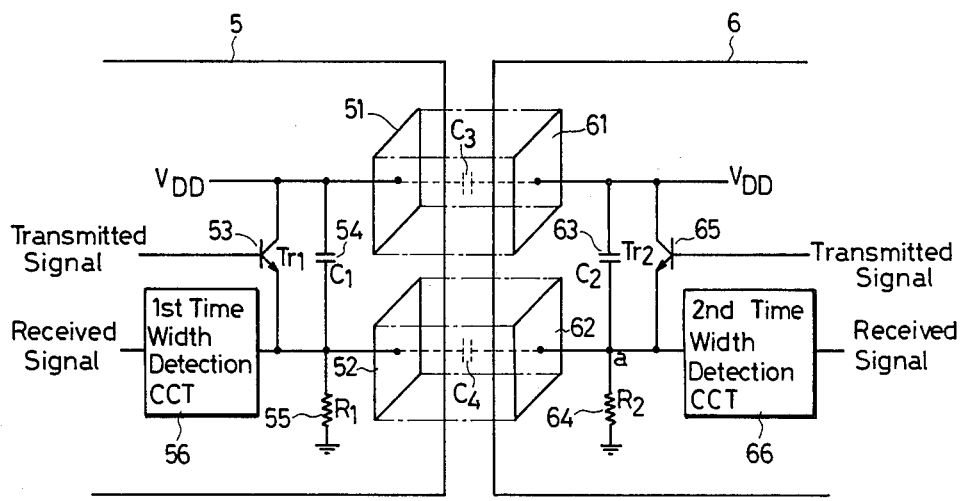

Referring now to FIG. 2 disclosed is a block diagram of another data-transmission circuit in accordance with a second preferred embodiment of the present invention.

The embodiment of FIG. 2 comprises an RC differentiating circuit version of the invention. In FIG. 2, a data-transmitting unit 5 and a data-receiving unit 6 are shown. The data-transmitting unit 5 comprises a pair of electrically conductive plates 51 and 52 made of any electrically conductive material, a capacitor 54 (C1), a pull-down resistance 55 (R1), a bipolar transistor 53 (Tr1), and a first time width detection circuit 56. The data-receiving unit 6 includes a pair of conductive plates 61 and 62 made of any electrically conductive material, a capacitor 63 (C2), a pull-down resistance 64 (R2), a bipolar transistor 65 (Tr2), and a second time width detection circuit 66. The pair of plates 61 and 62 are located opposite the pair of plates 51 and 52, respectively, to provide coupling capacitances of C3 and C4.

The circuit of FIG. 2 is characterized in that a change in the time constant of a differentiating circuit including capacitor 54 (C1) can enable the data signal to be transmitted and a change in the time constant of a differentiating circuit including the capacitor of the condenser 63 (C2) can permit the input data signal to be detected and thereby output the signal received. When the transistor 53 (Tr1) in the data-transmitting unit 5 is repeatedly to be switched on and off, the second time width detection circuit 66 in the data-receiving unit 6 detects the received signal by utilizing the voltage appearing at junction a and which comprises the voltage drop across the pull-down resistance 64 (R2). The junction a is provided at the connection point between the condenser 63 (C2) and the pull-down resistance 64.

If an RC integrating circuit is utilized in place of the above-mentioned differentiating circuit, the detecting integrating circuit detects the integrating time constant change in the transmitting unit.

The capacity coupling type data transmission of the present invention can be applied to any portable electronic apparatus such as an identification card incorporating an integrated circuit (IC), and any data terminal. It may be also possible that the data-transmitting unit and the data-receiving unit are integrated in a single unit, together.

While only certain embodiments of the present invention have been described, it will be apparent to those skilled in the art that various changes and modifications may be made therein without departing from the spirit and scope of the present invention as claimed.

What is claimed is:

1. A data transmission system for an electronic apparatus comprising:
    input means for inputting a data signal to be transmitted;
    capacitance changing means responsive to said input means and being operable to change its capacitance value according to the value of said data signal;
    transmitting means and receiving means, said transmitting means responsive to said capacitance changing means for capacitively coupling the capacitance value of said capacitance changing means to said receiving means,
    said receiving means for sensing the capacitance value from said transmitting means; and
    detecting means in said receiving means for detecting the capacitance value of said capacitance changing means and generating an output signal of the data signal inputted to said input means.

2. The system of claim 1, wherein said transmitting means and said receiving means each includes a pair of plates made of an electrically conductive material.

3. The system of claim 2 wherein said pair of plates in said transmitter means is capacitively coupled to said pair of plates in said receiving means.

4. The system of claim 3 wherein said pair of plates in said transmitting means is in relatively close proximity to said pair of plates in said receiving means.

5. The system of claim 4 wherein respective plates of said pairs of plates mutually oppose one another to form a pair of coupling capacitors.

6. The system of claim 5 wherein said data signal comprises a binary valued input signal and wherein said capacitance changing means is responsive to a first value of said input signal to provide a first composite capacitance value for controlling the frequency of said oscillator circuit so as to have a first operating frequency and to a second value of said input signal to provide a second composite capacitance value for controlling the frequency of said oscillator circuit so as to have a second operating frequency.

7. The system of claim 1, wherein said detecting means comprises an oscillator circuit and additionally including a frequency detection circuit for detecting the frequency of the oscillator circuit.

8. The system of claim 1 wherein said detecting means comprises an RC differentiating circuit and additionally including a detection circuit for detecting the time constant of said differentiating circuit.

9. The system of claim 1 wherein said detecting means comprises an RC integrating circuit and additionally including a detection circuit for detecting the time constant of said integrating circuit.

10. A capacitive coupling type data transmission system for an electronic apparatus comprising:

input means for accepting a digital data input signal to be transmitted;

capacitance means coupled to said input means and being responsive to said input signal to change its capacitance value according to the digital value of said input signal;

transmitting means and receiving means, said transmitting means coupled to said capacitance means for capacitively coupling the capacitance value of said capacitance means to said receiving means;

said receiving means for sensing the capacitance value coupled thereto; and detecting means in said receiving means for detecting the capacitance value of said capacitance means and generating a digital data output signal of said input signal.

* * * * *